(12) United States Patent
Zhou et al.

(10) Patent No.: US 10,021,054 B1
(45) Date of Patent: Jul. 10, 2018

(54) IMPLEMENTING SECURED EMAIL

(71) Applicants: Rongbiao Zhou, Beijing (CN); Yang Gao, Beijing (CN); Xunxiao Wang, Beijing (CN)

(72) Inventors: Rongbiao Zhou, Beijing (CN); Yang Gao, Beijing (CN); Xunxiao Wang, Beijing (CN)

(73) Assignee: CA, Inc., New York, NY (US)

( * ) Notice: Subject to any disclaimer, the term of this patent is extended or adjusted under 35 U.S.C. 154(b) by 177 days.

(21) Appl. No.: 14/033,640

(22) Filed: Sep. 23, 2013

(51) Int. Cl.
*G06F 15/16* (2006.01)
*H04L 12/58* (2006.01)
*G06Q 10/10* (2012.01)

(52) U.S. Cl.
CPC .......... *H04L 51/14* (2013.01); *G06Q 10/107* (2013.01)

(58) Field of Classification Search
CPC .................................................. G06Q 10/107
USPC .......................................................... 709/206
See application file for complete search history.

(56) References Cited

U.S. PATENT DOCUMENTS

| | | | | |
|---|---|---|---|---|
| 2002/0133706 A1* | 9/2002 | Khanna | ................... | G06F 21/31 713/182 |
| 2004/0122905 A1* | 6/2004 | Smith | .................. | G06Q 10/107 709/206 |
| 2004/0186890 A1* | 9/2004 | Huang | ................. | H04L 12/5865 709/206 |
| 2006/0101124 A1* | 5/2006 | Landis | ................. | G06Q 10/107 709/206 |
| 2009/0144636 A1* | 6/2009 | Beynon et al. | ................ | 715/752 |
| 2012/0131335 A1* | 5/2012 | Bailey | ................. | H04L 63/0428 713/164 |
| 2013/0240621 A1* | 9/2013 | Everett | ................... | G06Q 40/02 235/379 |
| 2014/0095319 A1* | 4/2014 | Bruns | .................... | G06Q 50/01 705/14.66 |
| 2014/0282963 A1* | 9/2014 | Wildermuth | ............ | H04L 63/08 726/7 |
| 2015/0019663 A1* | 1/2015 | Syrgabekov et al. | ......... | 709/206 |

FOREIGN PATENT DOCUMENTS

GB 2484116 * 4/2012 ............. H04L 12/58

OTHER PUBLICATIONS

Ross Smith IV, Exchange Server 2013 Architecture, Published 2012.

* cited by examiner

*Primary Examiner* — Hamza Algibhah
(74) *Attorney, Agent, or Firm* — Baker Botts L.L.P.

(57) ABSTRACT

A method for implementing secured messages via public e-mail services includes: receiving a content of an original message to be transmitted to a recipient; parsing the content of the original message into a plurality of segments; dividing the plurality of segments into a first group of segments and a second group of segments; generating a first message including the first group of segments and a second message including the second group of segments; and forwarding the first message via a first messaging service and the second message via a second messaging service different from the first messaging service. Further, a method includes receiving the first and the second messages via the first and the second messaging services and merging the first and the second messages to generate the original message.

9 Claims, 4 Drawing Sheets

Message Transmitting Process

Message Receiving Process

IMPLEMENTING SECURED EMAIL

BACKGROUND

The present disclosure relates generally to implementing secured electronic mail ("E-mail") messages via public E-mail services.

BRIEF SUMMARY

The present disclosure relates generally to methods or systems for implementing secured E-mail messages via public E-mail services.

According to an embodiment of the disclosure, a method includes receiving a content of an original message to be transmitted to a recipient. The method also includes parsing the content of the original message into a plurality of segments. The method further includes dividing the plurality of segments into a first group of segments and a second group of segments. The method still further includes generating a first message including the first group of segments and a second message including the second group of segments. The method additionally includes forwarding the first message via a first messaging service and the second message via a second messaging service different from the first messaging service.

According to another embodiment of the disclosure, a method includes receiving a first message via a first messaging service. The method also includes determining whether the first message includes an unique message ID and a content portion ID. The method further includes determining whether a second message including the unique message ID is received via a second messaging service. The method additionally includes generating an original message by merging the first message with the second message.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
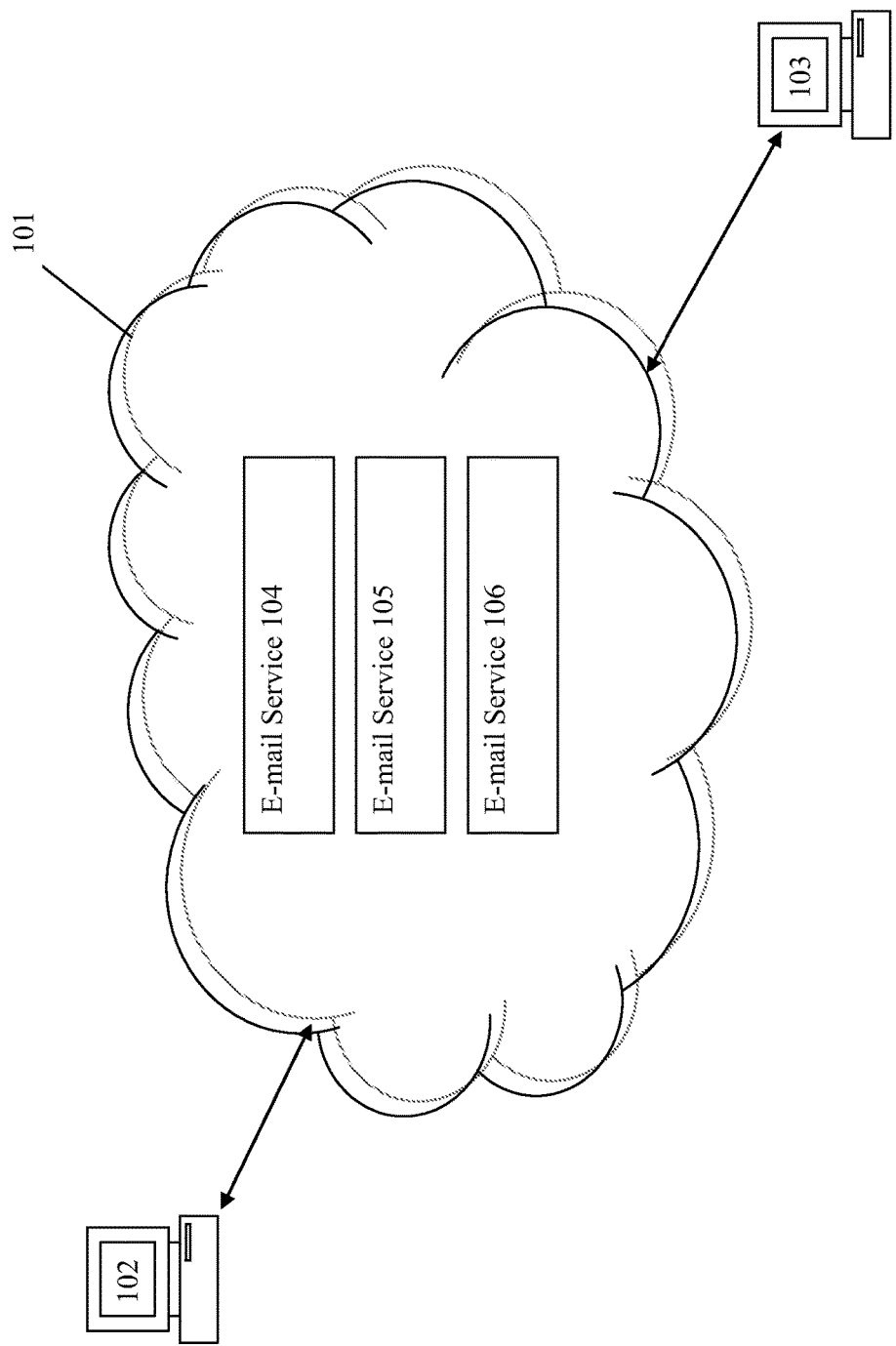
FIG. 1 is a diagram depicting communication terminals connected via a communication network according to an embodiment of the disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON®, JAVASCRIPT® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY®, Groovy, JAVASCRIPT®, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring to FIG. 1, an e-mail communication system may include communication terminals 102 and 103 connected to each other via a communication network 101.

Communication terminals 102 and 103 may be one or more of a desktop computer, a laptop computer, a server, a mobile communication device, a mobile computing device, or the like. Each of communication terminals 102 and 103 may send various messages, e.g., E-mails, to each other via communication network 101.

The messages may be transmitted via public e-mail services, such as GMAIL, HOTMAIL, YAHOO MAIL, or the like. For example, a user at communication terminal 102 may access a public e-mail service 104 using communication terminal 102. For example, the user may have an e-mail account at public e-mail service 104. The user may access, e.g., log into, the e-mail account using a unique user name and password. The user may compose and transmit a message to a recipient using public e-mail service 104.

Public e-mail service 104 may store the user's messages in one or more servers. For example, public e-mail service 104 may store messages received by the user, messages sent by the user, and messages composed by the user. Public e-mail service 104 may offer free email service to the user in exchange for access to user's private email messages for the purpose obtaining marketing and advertisement data. For example, public e-mail service may analyze the user's message and may display advertisements to the user based on the user's message. These advertisements may cause inconvenience or distraction to the user. Further, the user may prefer to keep the messages private. Even though the user may delete the messages stored at the public e-mail service, these messages may already have been archived by the public e-mail service.

In addition, the public e-mail services may not provide adequate security. For example, the messages stored in the public e-mail services may not be encrypted and may not be protected from unauthorized access to an e-mail account using only a password. Thus, public e-mail service may not offer adequate security.

The present disclosure may provide a method or a system for implementing secured e-mails. In particular, the content of an email may be divided into two or more groups of segments. The two or more groups of segments may be transmitted to a recipient via two or more different public e-mail service. The two or more groups of segments of the e-mail message may be combined to form a complete e-mail message at the recipient side. Because each group of segments may include segments taken from various portions of the message, each group of segments may include non-intelligible contents. Thus, each group of segments may be non-intelligible to a public e-mail service or an unauthorized user. Therefore, it may be difficult for a public e-mail service to analyze the content of the message for the purpose of extracting advertisement or marketing data. Further, an unauthorized user may not be able to comprehend the content of the message to gain private information.

Figure 2:
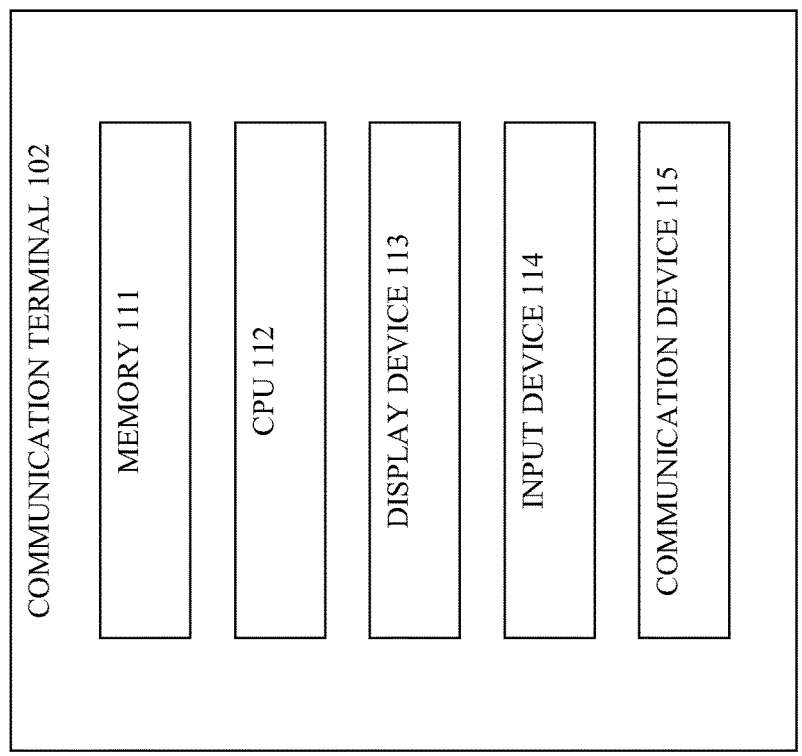
FIG. 2 is a schematic representation of a communication terminal according to an embodiment of the disclosure.

Referring to FIG. 2, communication terminal 102 may include a memory 111 and a central processing unit ("CPU") 112. Memory 11 may store computer readable programs or instructions, that when executed by CPU 112, controls display terminal 102 to preform respective processes. For example, memory 111 may store computer readable programs for executing an E-mail application for receiving, generating, and sending E-mail messages. Display terminal 102 may include a user interface, e.g., a display device 113, such as a computer screen, a touch screen, a projector, or the like. Display device 113 may receive instructions from CPU 112 to display various information, e.g., messages, images, or the like. Display terminal 102 may include an input device 114, e.g., a keyboard, a mouse, a touch screen, or the like, that may receive user inputs. Further, communication terminal 102 may include a communication device 115 that may send and receive messages from other devices by wired communication, e.g., Ethernet, USB cable, or the like, or wireless communication, e.g., WiFi, Bluetooth, cellular, or the like. CPU 112 may control and facilitate the operations of the aforementioned devices. Communication terminal 103 may include similar components as communication terminal 102.

Communication terminal 102 may execute a message transmitting process and a message receiving process. For example, communication terminal 102 may execute and display an E-mail application. Communication terminal 102 may receive user instructions in the E-mail application to generate a message.

Figure 3:
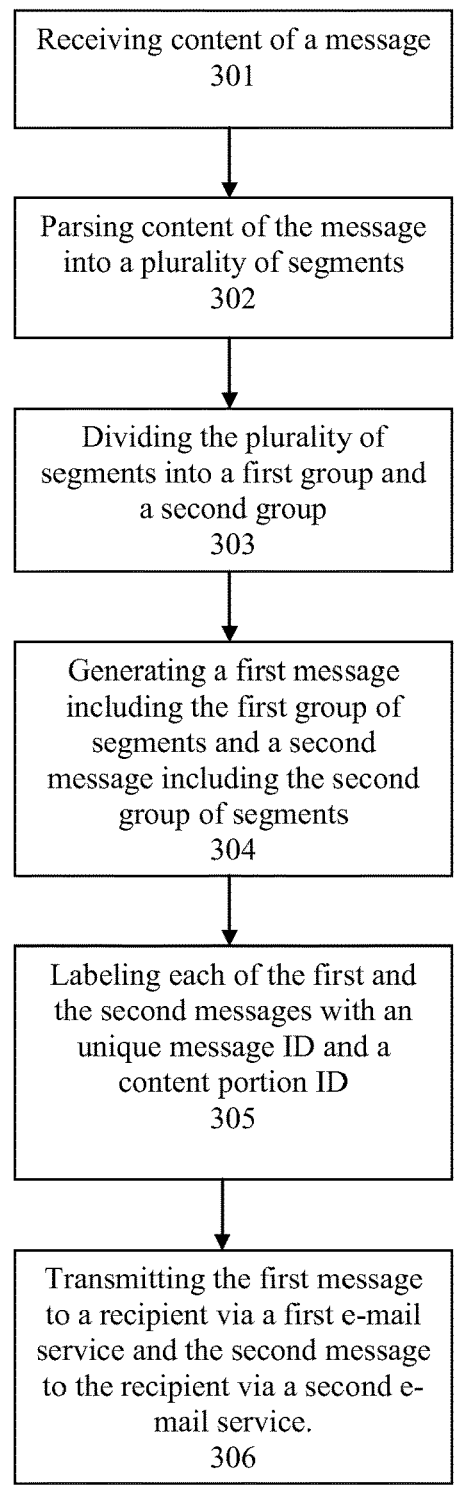
FIG. 3 is a flowchart depicting a message transmitting process according to an embodiment of the disclosure.

Referring to FIG. 3, a message transmitting process may be executed by communication terminal 102. For example, the message transmitting process may be executed by CPU 112 of communication terminal 102. At step 301, communication terminal 102 may receive content of a message. For example, communication terminal 102 may receive the content of the message from a user via input device 114. The user may input the content of the message using input device, e.g., a keyboard, a touch screen, a mouse, or the like. Communication terminal 102 also may receive the content of the message from another communication terminal.

At step 302, CPU 112 may take the content of the message and may parse them into segments. For example, if the content of the message is "password 12345678," the content may be parsed into 17 different segments of "p", "a", "s", "s", "w", "o", "r", "d", "_", "1", "2", "3", "4", "5", "6", "7", "8". (The symbol "_" may represent a space). The message may include headings and attachments, which may similarly be parsed into segments.

At step 303, CPU 112 may divide these segments into two different groups. In particular, segments that are adjacent to each other may be divided into different groups. For example, segments: "p", "s", "w", "r", "_", "2", "4", "6", and "8" may be designated for the first group and segments: "a", "s", "o", "d", "1", "3", "5", and "7" may be designated for the second group. In another embodiment, CPU 112 may divide the segments into more than two different groups. For example, CPU 112 may divide the segments into five different groups and each of the five groups may include about one fifth of the content of the message. The first of the five groups may include "p", "o", "2", and "7". The second of the five groups may include "a", "r", "3", and "8". The third of the five groups may include "s", "d", and "4". The fourth of the five groups may include "s", "_", and "5". The fifth of the five groups may include "w", "1", and "6".

At step 304, CPU 112 may generate a first message including the first group of the segments and a second message including the second group of the segments. For example, the first message may have the content "pswr 2468" and the second message may have the content "asod1357." Thus, the contents of the first and the second messages may be non-intelligible to other users or text recognition devices. In the embodiment in which the content is divided into five groups, CPU 112 may generate five messages from the five groups of segments.

At step 305, CPU 112 may label each of the first and the second messages with a unique message ID and a content portion ID. For example, each of the first and the second message may be labeled with the same unique message ID "unique_hash", because they are both generated based from the same original message. The first message may be labeled with a content portion ID "1-2", indicating that the first message is the first one of two messages. The second message may be labeled with a content portion ID "2-2", indicating that the second message is the second one of two messages.

At step 306, the CPU 112 may control communication device 115 to transmit the first message to a recipient via E-mail service 104 and transmit the second message to the same recipient via E-mail service 105. Thus, the first and the second messages may be transmitted via two different E-mail services. For example, the E-mail application at communication terminal 102 may allow a user to designate two or more public e-mail services through which message may be transmitted. The user may enter login ID's and passwords for each of the public e-mail services through which the messages may be transmitted. Using the login ID's and passwords, the E-mail application may automatically log into e-mail service 104 and transmit the first message via e-mail service 104 and may automatically log into e-mail service 105 and transmit the second message via e-mail service 105.

Because the content of the first message sent through e-mail service 104 is non-intelligible to e-mail service 104, e-mail service 104 may not analyze and use the content for advertisement or marketing purpose. Further, even if a malicious user gains unauthorized access to the e-mail account, private information in the messages may not be obtained by the malicious user, because the contents of the messages may be non-intelligible to the malicious user.

Access to both e-mail accounts at e-mail service 104 and e-mail service 105 may be required to gain obtain the entire contents of the messages. Thus, security may be increased by using more e-mail accounts at more public e-mail services. For example, a user may designate five different e-mail accounts at five different public e-mail services to be used for message transmission. The message may be divided into five groups of segments and each group of segments may be transmitted through one of the five different public e-mail services. Access to five different e-mail accounts at five different public e-mail services may be required to gain access to the entire contents of the messages. Because it may become more difficult to gain unauthorized access to five different e-mail accounts, the security for the contents of the messages may substantially be increased.

Figure 4:
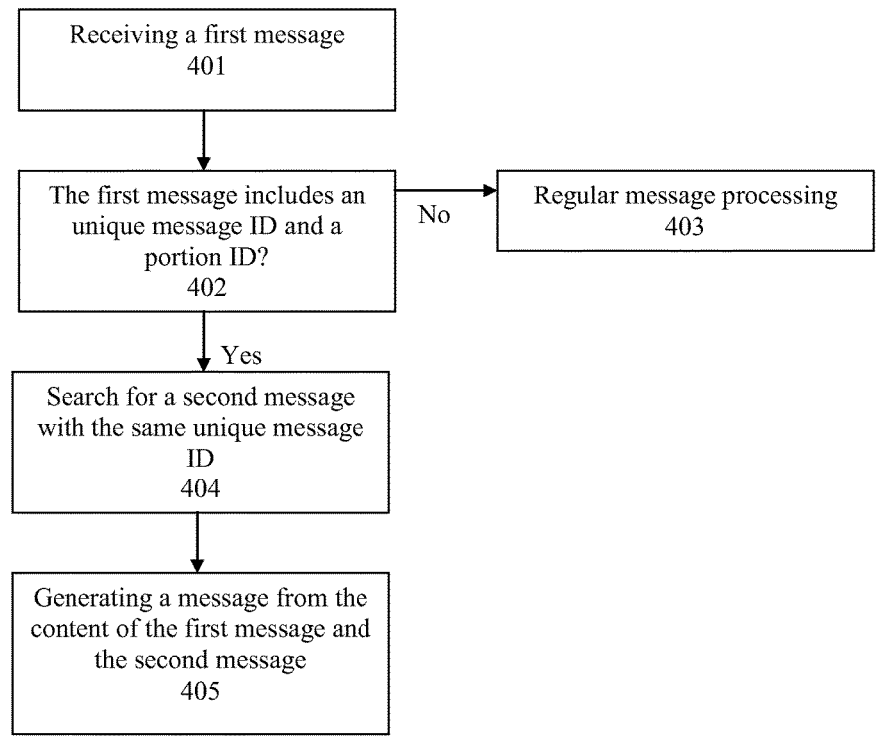
FIG. 4 is a flowchart depicting a message receiving process according to an embodiment of the disclosure.

Referring to FIG. 4, communication terminals 103 may execute a message receiving process to receive an e-mail message. For example, the message receiving process may be executed by CPU 112 of communication terminal 103 to receive messages sent from communication terminal 102. At step 401, communication terminal 103 may receive a first message from communication terminal 102 via communication network 101. For example, communication terminal 102 may send the first message via e-mail service 104. E-mail service 104 may forward the first message to communication terminal 103. CPU 112 of communication terminal 103 may control communication device 115 to receive the first message.

At step 402, communication terminal 103 may determine whether the first message includes a unique message ID and a content portion ID. For example, CPU 112 may read and determine whether the heading of the first message has a "unique_hash" and "1-2". In another embodiment, CPU 112 may search the body of the first message for the unique message ID and the content portion ID.

If CPU 112 determines that the first message does not include a unique message ID and a content portion ID, CPU 112 may process the first message as a regular message, e.g., a non-secured message, at step 403. For example, if CPU 112 determines that the first message does not include a unique message ID and a content portion ID, CPU 112 may store the first message in an INBOX folder of the e-mail application. Thus, a user may view the received first message in the list of messages in the INBOX folder. If CPU 112 determines that the first message includes an unique message ID and a content portion ID, at step 404, CPU 112 may search for a second message, which contains the same unique message ID as that of the received first message. CPU 112 may determine the number of messages with the same unique message ID that are sent to communication terminal 103 based on the content portion ID. For example, if the content portion ID is "1-2", indicating that the first message is the first of two messages, CPU 112 may determine that there are all total of two messages with the same unique message ID that have been sent to communication terminal 103. CPU 112 may search and determine whether all of the messages with the same unique message ID have been received.

After all of the messages with the same unique message ID have been received, CPU 112 may generate a complete message from the received messages at step 405. If the original message was divided into two messages, e.g., the first and the second messages, CPU 112 may merge the contents of the first and the second messages into one complete message. For example, CPU 112 may merge the content "pswr 2468" of the first message and the content "asod1357" of the second message into one complete message having the content "password 12345678".

In particular, CPU 112 may parse the content of the first message into "p", "s", "w", "r", "_", "2", "4", "6", and "8". CPU 112 also may parse the content of the second message into "a", "s", "o", "d", "1", "3", "5", and "7". CPU 112 then may generate the new message using segments from the first and second message. Specifically, CPU 112 may extract segments alternating between the first and the second message and inserting the segments into the content of the new message. For example, CPU 112 may first take "p" from the first message, and then may take "a" from the second message, "s" from the first message, "s" from the second message, "w" from the first message and so forth, alternating between the first and the second messages. The new message having the content of "password 12345678" may be generated from the first and the second messages. Thus, the original message, which was divided into two messages, may be reconstructed from the first and the second messages.

In an embodiment in which the original message is divided into five messages, CPU 112 may alternate among five messages taking segments from each of the five messages in the specific order as indicated by the message content ID. Accordingly, by executing the message receiving process, a message, that was divided and sent through different public e-mail services, may be reconstructed back to the original message.

By using the message transmitting process and the message receiving process, messages sent via public e-mail services may be secured, because the original message may be divided into two or more messages each of which may be sent via a different public e-mail service. Because each of the divided messages may include non-intelligible content, it may be difficult for public e-mail services to analyze and extract private data from these divided messages for the purpose of marketing and advertisement. Further, even if a malicious user gains unauthorized to an e-mail account of a public e-mail service, the malicious user may not be able to extract private data from the e-mail account because the messages may be non-intelligible. Accordingly, by utilizing the above-described message transmitting and receiving processes, secured e-mail messaging may be implemented using public e-mail services.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:

receiving, from a user and through an input device associated with one or more processors:
   login identifiers and passwords for a plurality of different email accounts each hosted by different public email services; and
   a designation of more than one of the plurality of email accounts to use in sending content of an original message to a recipient;

determining a number of segments to divide the content of the original message into based on a number of email accounts designated by the user, wherein each of the different public email services analyze contents of email messages to extract private data for targeting advertisements to the user based on the private data;

parsing, by the one or more processors, the content of the original message into the number of segments such that each of the email accounts that analyze contents of email messages are not able to extract any private data from the characters in each segment, wherein the parsing further comprises placing content from the original message into each segment by alternating between each segment, such that adjacent content from the original message are not placed in the same segment;

before sending the content to any messaging server, generating, by the one or more processors, a respective message for each segment, wherein each message comprises (1) a message content identifier that specifies an order for recombining each character from each message to reconstruct the original message, and (2) a unique message identifier comprising a unique hash value of the original message contents;

automatically logging into, by the one or more processors, each of the designated email accounts using the login identifiers and passwords provided by the user; and sending, by the one or more processors, each message using a respective one of the designated email accounts.

2. The method of claim 1, the generating each respective message comprising:

labeling a first message with a unique message ID indicating the original message and a first content portion ID indicating that the first message is a first one of a number of messages corresponding to the number of segments; and labeling a second message with the unique message ID indicating the original message and a second content portion ID indicating that the second message is a second one of the number of messages.

3. The method of claim 1, further comprising:
receiving a corresponding user identifier and password for each of the email accounts associated with the user, wherein the forwarding further comprises:
using the user identifier and password corresponding to a first messaging account to log into the first messaging account and send a first message; and
using the user identifier and password corresponding to a second messaging account to log into the second messaging account and send a second message.

4. A communication device comprising:
a processor; and
a computer-readable storage medium storing computer-readable instructions, which when executed by the processor, cause the processor to perform:
receiving, from a user and through an input device associated with the processor:
login identifiers and passwords for a plurality of different email accounts each hosted by different public email services; and
a designation of more than one of the plurality of email accounts to use in sending content of an original message to a recipient;
determining a number of segments to divide the content of the original message into based on a number of email accounts designated by the user, wherein each of the different public email services analyze contents of email messages to extract private data for targeting advertisements to the user based on the private data;
parsing the content of the original message into the number of segments such that each of the email accounts that analyze contents of email messages are not able to extract any private data from the characters in each segment, wherein the parsing further comprises placing content from the original message into each segment by alternating between each segment, such that adjacent content from the original message are not placed in the same segment;
before sending the content to any messaging server, generating a respective message for each segment, wherein each message comprises (1) a message content identifier that specifies an order for recombining each character from each message to reconstruct the original message, and (2) a unique message identifier comprising a unique hash value of the original message contents;
automatically logging into each of the designated email accounts using the login identifiers and passwords provided by the user; and
sending each message using a respective one of the designated email accounts.

5. The communication device according to claim 4, the generating each respective message comprising:
labeling a first message with a unique message ID indicating the original message and a first content portion ID indicating that the first message is a first one of a number of messages corresponding to the number of segments; and
labeling a second message with the unique message ID indicating the original message and a second content portion ID indicating that the second message is a second one of the number of messages.

6. The communication device according to claim 4, wherein the computer-readable instructions further cause the processor to:
receive a corresponding user identifier and password for each of the email accounts associated with the user, wherein the forwarding further comprises:
using the user identifier and password corresponding to a first messaging account to log into the first messaging account and send a first message; and
using the user identifier and password corresponding to a second messaging account to log into the second messaging account and send a second message.

7. A computer program product comprising:
a computer readable storage medium having computer readable program code embodied therewith, the computer readable program code comprising:
computer readable program code configured to receive, from a user and through an input device associated with one or more processors:
login identifiers and passwords for a plurality of different email accounts each hosted by different public email services; and
a designation of more than one of the plurality of email accounts to use in sending content of an original message to a recipient;
computer readable program code configured to determine a number of segments to divide the content of the original message into based on a number of email accounts designated by the user, wherein each of the different public email services analyze contents of email messages to extract private data for targeting advertisements to the user based on the private data;
computer readable program code configured to parse the content of the original message into the number of segments such that each of the email accounts that analyze contents of email messages are not able to extract any private data from the characters in each segment, wherein the parsing further comprises placing content from the original message into each segment by alternating between each segment, such that adjacent content from the original message are not placed in the same segment;
computer readable program code configured to, before sending the content to any messaging server, generate a respective message for each segment, wherein each message comprises (1) a message content identifier that specifies an order for recombining each character from each message to reconstruct the original message, and (2) a unique message identifier comprising a unique hash value of the original message contents;
computer readable program code configured to, automatically log into each of the designated email accounts using the login identifiers and passwords provided by the user; and
computer readable program code configured to send each message using a respective one of the designated email accounts.

8. The computer program product of claim 7, the generating each respective message comprising:
labeling a first message with a unique message ID indicating the original message and a first content portion ID indicating that the first message is a first one of a number of messages corresponding to the number of segments; and
labeling a second message with the unique message ID indicating the original message and a second content portion ID indicating that the second message is a second one of the number of messages.

9. The computer program product of claim 7, the computer readable program code further comprising:
- computer readable program code configured to, receive a corresponding user identifier and password for each of the email accounts associated with the user, wherein the forwarding further comprises:
  - using the user identifier and password corresponding to a first messaging account to log into the first messaging account and send a first message; and
  - using the user identifier and password corresponding to a second messaging account to log into the second messaging account and send a second message.

* * * * *